INVENTOR
Victor Stoll
BY
his ATTORNEYS

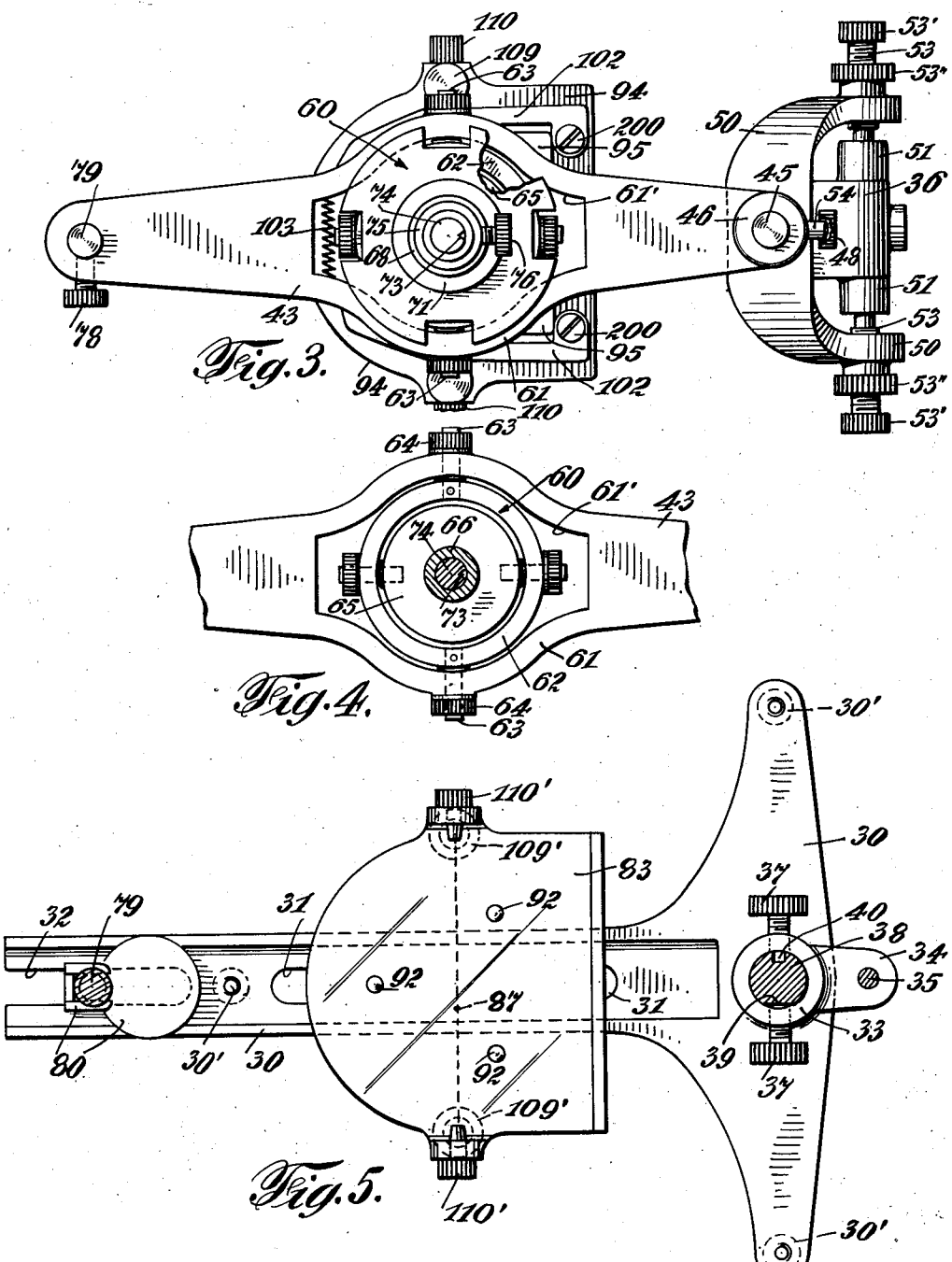

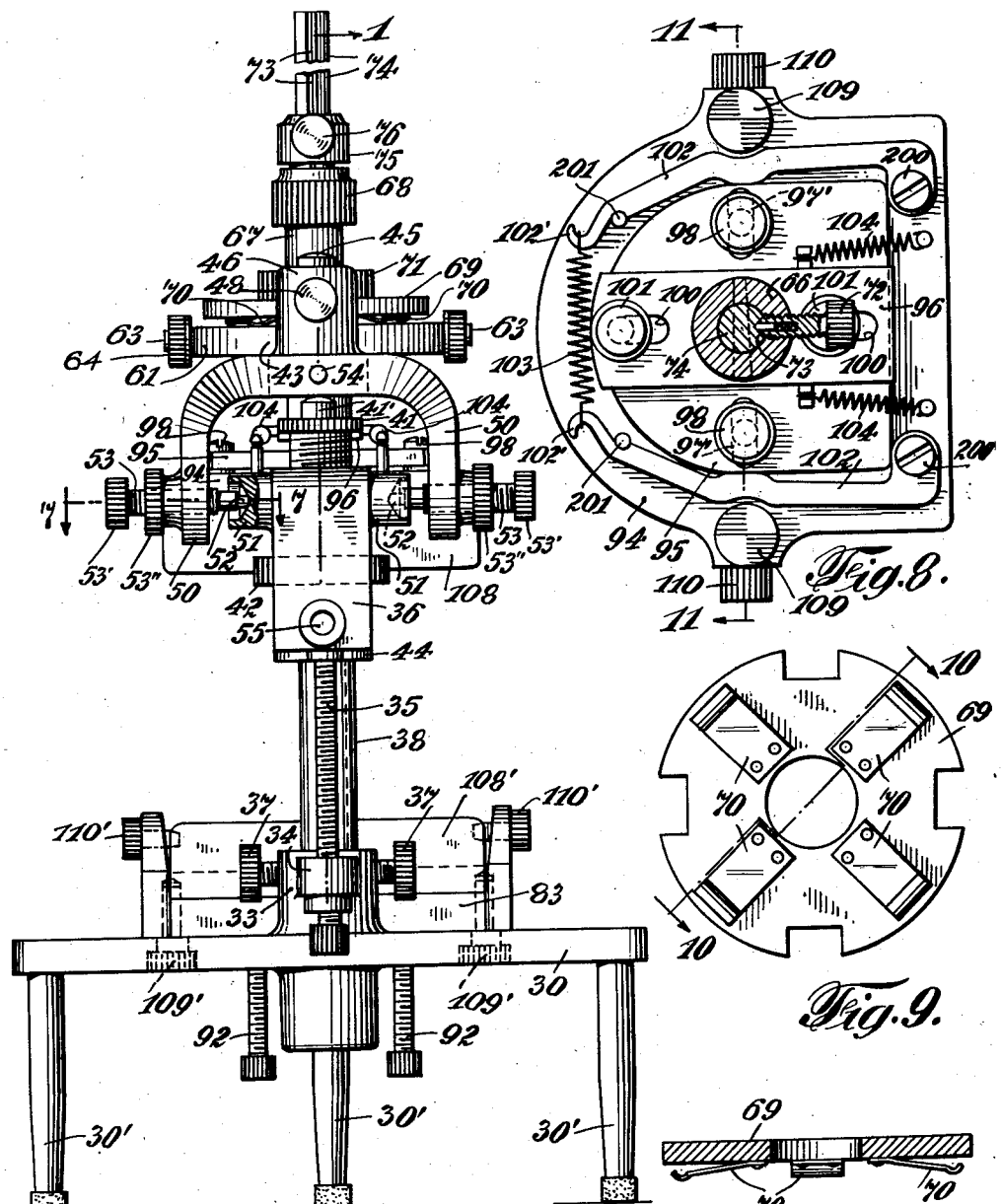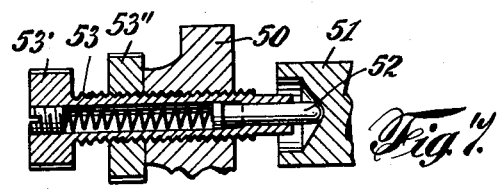

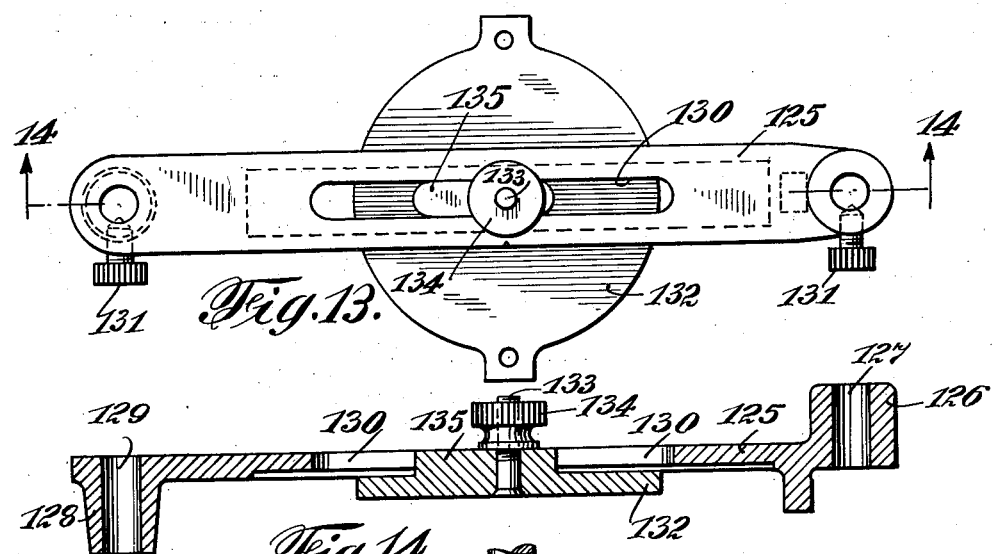
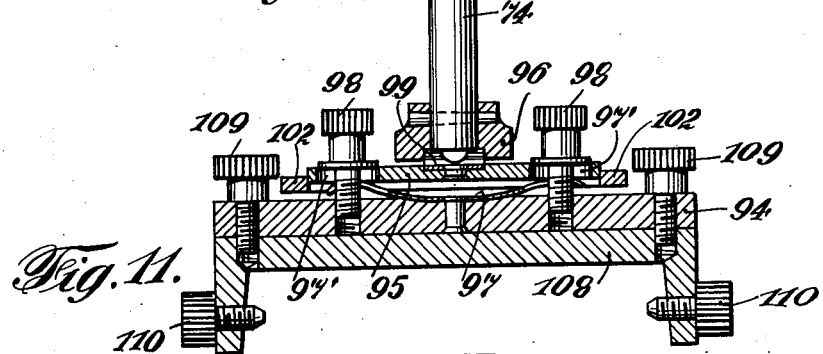
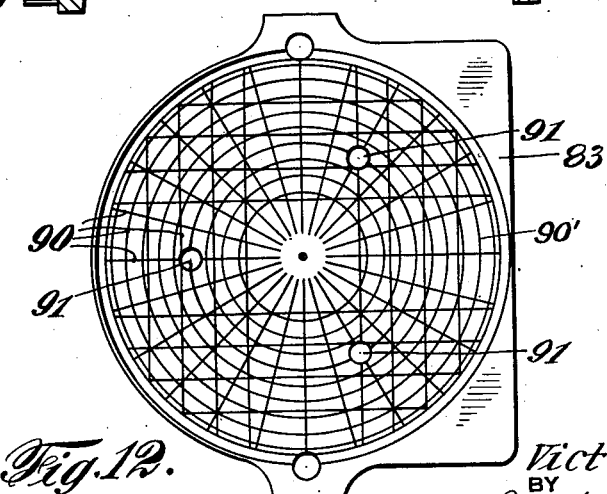

June 6, 1950  V. STOLL  2,510,152
DENTAL SURVEYOR AND COORDINATOR
Filed May 1, 1947  6 Sheets-Sheet 5

INVENTOR
Victor Stoll
BY
Rackenbach & Hirschman
his ATTORNEYS

June 6, 1950 V. STOLL 2,510,152
DENTAL SURVEYOR AND COORDINATOR
Filed May 1, 1947 6 Sheets-Sheet 6

INVENTOR
Victor Stoll
BY
Rackenbach & Herschman
ATTORNEYS

Patented June 6, 1950

2,510,152

UNITED STATES PATENT OFFICE 2,510,152

DENTAL SURVEYOR AND COORDINATOR

Victor Stoll, New York, N. Y.

Application May 1, 1947, Serial No. 745,307

11 Claims. (Cl. 32—32)

My invention relates to a method and apparatus affording a scientifically-based and correct and absolute procedure for surveying the dental mechanism of the human body for diagnosis and the study of the growth and development of human dentition and outline of treatment for dental abnormalities. By the utilization of my novel method and apparatus a complete analysis and survey of the human dentition and the geometric form of the dental apparatus may be made by the dental practitioner for the purpose of ascertaining the actual deficiencies of the dental apparatus of the patent, and to determine the corrective measures necessary to overcome the defects thus demonstrated and to plan the restoration and reconstruction of abnormal structural defects and irregularities in the dental apparatus.

Thus, the primary object of my invention is to provide an accurate method and precise apparatus for assisting the dental practitioner to determine the necessary corrective adjustments or restorative reconstruction necessary to bring the dental apparatus being analyzed into conformity with the natural normal structure. By means of my apparatus the necessary coordination between the actual architectural and dental apparatus being analyzed is made with respect to the normal and substantially perfect dentition so that the necessary reconstruction can be effected to overcome such defects as malcoordination of the jaws, malocclusion, malarticulation and the reconstruction of broken-down and missing dental structures in restorative dentistry.

The basic principles of my analyzer and coordinator and the method for its utilization are predicated upon the provision of means for finding with accuracy the deviations from normal and to predict the results in re-establishing the normal, through comparison of a denture or dentures consisting of a plaster cast of the patient's dental apparatus with a denture or plaster cast of a perfect set of teeth of an individual of the same age, sex and other pertinent factors. By means of my method and apparatus the differences in the architectural structure and operation of the dental apparatus of the patient are clearly and definitely brought out by the analysis and coordinated so that the differences and deficiencies are clearly and specifically demonstrated to the dental technician, thereby enabling him to ascertain what corrective measures should be taken to bring the dental apparatus surveyed and diagnosed into proper condition either by correction of a natural dentition by means of orthodontia or mechanical restoration.

Heretofore all dental restorative and corrective problems had been attacked and solved in practice on a trial and error basis with the obvious results to be expected from such trial and error effort. By means of my dental analyzer and coordinator and the method of its utilization, all guessing by the dental practitioner is substantially eliminated and there is brought into a scientific system the necessary study, analysis, coordination and plan of reconstruction or restoration which is indicated to correct structural defects, irregularities and malalignment.

In order to demonstrate more clearly the objects of my invention and the advantages thereof, the following brief résumé of the structurally ideal human dental apparatus is set forth.

Structurally, such ideal human dental apparatus consists of two halves united vertically at the median plane, each half being the congruent and symmetrical counterpart of the other. The dental mass in the skull forms the shape of a spherical cone in the base of which the teeth are set with a center on the vertical axis of two intersecting vertical planes. The cuspal surfaces of the grinding teeth form three continuous curved lines. One of such lines is formed by the crests of the outer cusps continuous with the incisal edges of the front teeth; another line is formed by the grooves in the middle of the grinding teeth; and a third line is formed by the crests of the lingual or inner cusps of the bicuspids and molars. The three lines have different radii from the common center and the axes of the lower teeth diverge from the center of the upper denture. The proper relationship of the dental arches is determined by the fitting of the upper mesial buccal cusp into the central buccal groove of the lower teeth and the upper canine falls between the lower canine and first bicuspid. When the upper and lower teeth are in contact with each other, they are in centric or static occlusion.

This architectural structural arrangement of the human dental apparatus is such that the complicated mechanical processes of mastication can be performed smoothly and with ease by moving the lower teeth over the upper teeth. This natural and definite form and structure is necessary in the proper performance of physiological function. When such definite form and structure has been destroyed as by any portions of the apparatus having broken down or are missing, proper performance of the complicated and mechanical processes of mastication is impossible. When such architectural plan of the human dental mechanism is no longer in balance it must be brought by reconstruction or restoration to as near such balance as possible.

In order to re-effect such balance, a definite geometrical plan must be carried out and a set of geometrical tools for the analysis and surveying of the broken-down or maladjusted dental mechanism is necessary to enable the practitioner to effect reconstruction for proper function.

Any incorrect structure found by examination cannot be effectively remedied unless it is recognized. Improper dental functioning cannot be made proper and effective unless such incorrect structure is first remedied. This can only be accomplished by the proper analysis and coordination which will indicate the desirable corrections and restorations. Since improper functioning is necessarily due to improper structural architecture, it is evident that the only way in which proper functioning can be secured is to correct the structure.

In accordance with my invention, and by the utilization of my dental surveyor and coordinator, I enable the practitioner to ascertain by simple comparison of the improper structural architecture with the ideal and normal structural architecture to determine the measures for re-formation and reconstruction necessary to bring the maladjusted dental mechanism into its natural condition and thereby enable it to recover its natural mode of operation and function.

In its broadest aspects my novel dental analyzer and coordinator comprises a plurality of interacting mechanical elements so constructed and operatively mounted that they will not only produce and perform all of the possible movements of the human dental mechanism, but that they will also measure, indicate and determine the proper position of each part of the dental apparatus.

In accordance with my invention, therefore, I provide an apparatus whereby a dental cast of an upper set of teeth and a dental cast of a lower set of teeth can be positioned in the apparatus in such a manner that they can be made to move with respect to each other through every movement to which they are subjected within the human mouth, and that each of said movements can be readily observed and any interference in occlusion or in the abutment of the surface of the teeth can be made to indicate the basis for the necessary changes and corrections to be made in the two mounted dental casts to produce a proper functioning of the corrected sets of teeth when in the mouth of the patient.

It will thus be seen that a skilled operator can make by the use of my apparatus readily and accurately correct natural dentures or produce artificial dentures of the highest precision for the accomplishment of the necessary functions when inserted in the human mouth, including not only proper mastication, but also for the formation and maintenance of correct facial contour, while at the same time providing proper muscle and nerve performance in harmony with the adjacent organs of speech, respiration and ventilation.

In the accompanying drawings, I have illustrated, by way of example, a specific embodiment of my invention. Throughout such drawings, similar parts are indicated by similar reference characters.

Fig. 3 is a top view of the apparatus of Fig. 1.

Fig. 4 is a section taken along the line 4—4 of Fig. 1.

Fig. 5 is a section taken along the line 5—5 of Fig. 1.

Fig. 6 is a rear elevation of the apparatus of Fig. 1.

Fig. 7 is a section along the line 7—7 of Fig. 6.

Fig. 8 is a section along the line 8—8 of Fig. 1.

Fig. 9 is a bottom view of the gimbal spring disc of the apparatus of Fig. 1.

Fig. 10 is a section along the line 10—10 of Fig. 9.

Fig. 11 is a section along the line 11—11 of Fig. 8.

Fig. 12 is a top view of the lower disc plate of the apparatus of Fig. 1.

Fig. 13 is a top view of a modified form of the upper portion of the apparatus of Fig. 1.

Fig. 14 is a section along the line 14—14 of Fig. 13.

Figure 17:
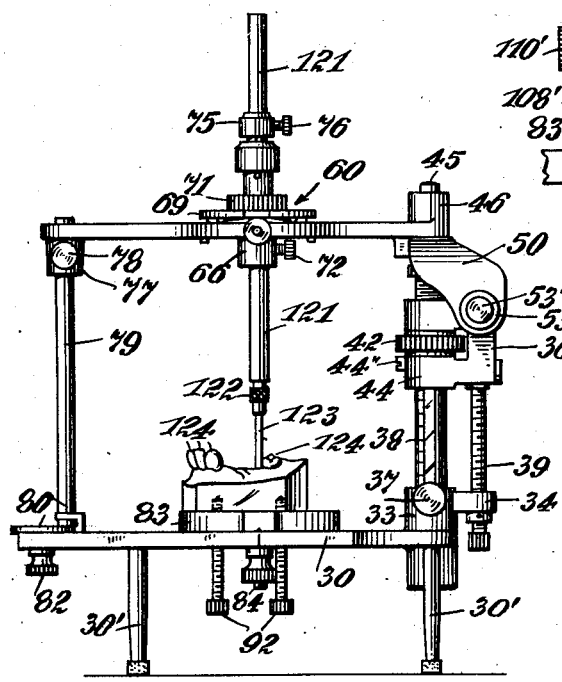

Fig. 17 is a side elevational view of my device with a central shaft in the locked gimbal ending in a chuck which carries a paralleling attachment in order to align the teeth in parallel positions or to outline clasps for a removable denture in perfect parallelism to each other or to secure precision attachments to the teeth, perfectly parallel to each other for a removable appliance, or to carve wax patterns on the teeth parallel to each other.

Figure 18:
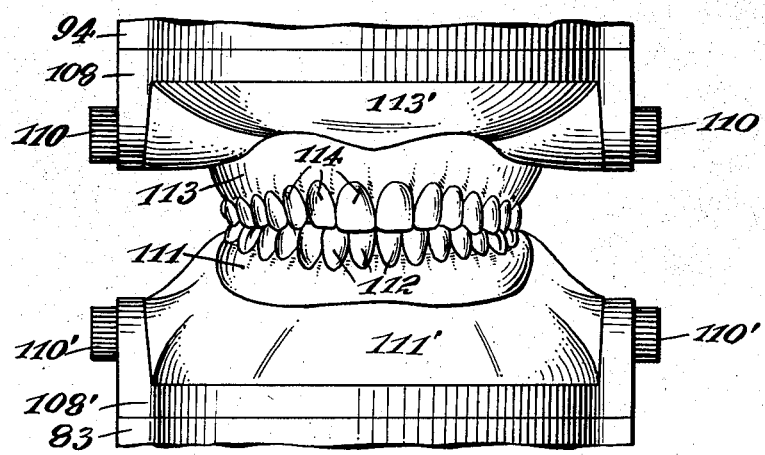

Fig. 18 is a fragmentary front view of my apparatus showing dental casts of a complete upper and lower set of teeth held within their respective holding plates in proper relation to each other in concentric occlusion.

Figures 19, 20:
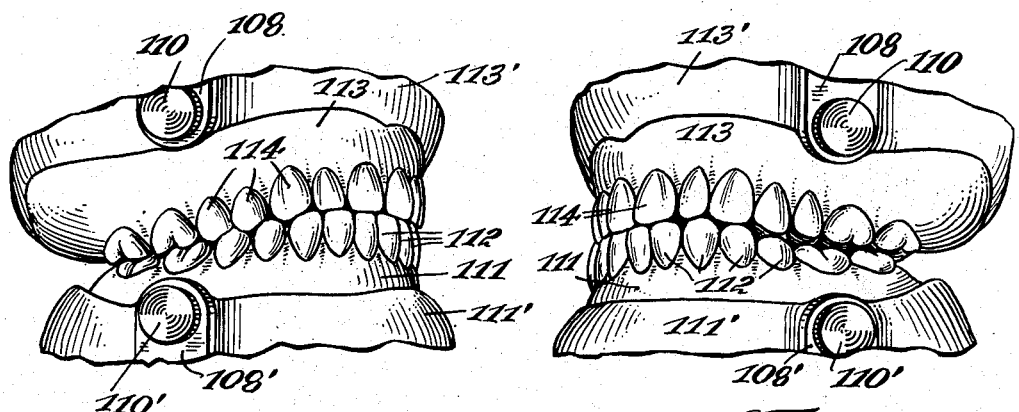

Fig. 19 is a view of one side of Fig. 18, with the lower set of teeth having been moved slightly to the right with respect to the upper set of teeth, showing the relationship of the cusps of the upper and lower teeth to each other on the working side and in lateral balanced occlusion.

Fig. 20 is a view of the opposite side of Fig. 19, showing the relation of the upper and lower cusps on the balancing side.

The particular form of an apparatus constructed and utilized in accordance with my invention as shown in the accompanying drawings, comprises a triangular base 30 supported by the three legs 30', 30', 30', and having a centrally positioned slot 31 and another slot 32 in the front end portion thereof, the other end of the base 30 having a bushing 33 with an extension 34 for the reception of an elongated threaded bar 35 supporting the member 36. On opposite sides of the bushing 33, there are two threaded holes adapted to receive the screws 37, 37. A graduated shaft 38 is adapted to pass through an opening in the bushing 33 and supports the member 36. The graduated shaft 38 has a flat surface 39 upon one side for clamping purposes and a guide slot 40 on the other side adapted to guide the shaft 38 vertically through the bushing, by releasing the binding screws 37, 37, in raising and lowering the shaft 38 with everything attached thereto. In the top of the shaft 38 is a centrally positioned threaded hole for the receipt of the adjustable threaded screw 41 having an expansion knurled nut 41' threaded thereon. When the screw 41 is set, the platforms 30 and 43 will be level and in parallel planes. The member 36 can be raised and lowered upon the shaft 38 by releasing the binding screws 37, 37 and then by revolving the knurled threaded nut 42 engaging corresponding threads upon the shaft 38. This will permit the platform 43 to be moved on the hinge pin 52. The lower portion of the member 36 has a bushing 44 through which the graduated shaft 38 is capable of passing. A slot 44' and stop pin 44" are provided to limit the upward movement of the threaded part of the shaft 38, and thus insure a rectangular position of the platform 43.

A gimbal supporting element comprises the platform 43, one end portion of which is extended into the bushing 46, through an opening of which there is the rod 45 having a recess 47 therein for the reception of the screw 48.

The hinged elements comprise the lower member 36 and upper member comprising the yoke 50, and the following elements hingedly attaching the yoke 50 to the member 36. Cylindrical members 51, 51, have cup-shaped recesses in the ends thereof, extend from the member 36 on each side thereof. Within each cup-shaped end of the member 51 is a hardened steel pin 52 maintained under controlled spring pressure housed within a threaded screw 53, each said threaded screw 53 meshing within a hole with a leg of the yoke 50 and having a knurled terminal head 53' and carrying a lock nut 53", as shown particularly in Fig. 7. In the rear portion of the upper portion of the yoke 50, is a pin 54, which falls within the recess 55 of the member 36 when the yoke is revolved 180° upon its hinge.

A gimbal 60 is positioned in the central portion of the platform 43 comprising an outer ring-like portion 61 formed by the opening 61" in the platform 43, to which an inner ring 62 is axially attached by threaded pins 63, 63 through clearing holes in the outer ring 61 and each carrying a knurled nut 64. A disc 65 is positioned within the ring 62 and is similarly attached thereto in a cross axis. The disc 65 carries a centrally positioned bushing 66, the upper portion 67 of which is slotted and threaded and ends in a chuck 68. A disc 69 covers the gimbal and a plurality of flat springs 70, 70 are positioned below the disc 69, and above and abutting upon the disc 69 is a threaded nut 71, the revolution of which will lock the gimbal, open it completely, or allow the function of the gimbal under the resistance of the springs 70, 70. If the nut 71, the disc 69, and the springs 70, 70 are loosened, the gimbal can be used as a universal joint. The gimbal is so arranged that it can be locked in any position by means of lock nuts. A screw 72 with a spring-pressed pin within the longitudinal groove 73 of the shaft 74 prevents the rotation of the said shaft. On the upper portion of the shaft 74 is a stop collar 75 with a set screw 76. In the front portion of the platform 43 is a bushing 77 with a set screw 78. A stabilizing graduated rod 79, having a recess 81 at the lower end thereof, passes through an opening in the bushing 77 and rests on an adjustable platform 80 which is so positioned above and upon the frame base 30 and over the slot 32. The platform 80 can be moved longitudinally along the upper face of the frame base and be locked in position by means of the locking member 82, thus locking the platform 43 with its parts to the frame base 30.

Positioned above the opening 31 in the base member 30 is a disc 83 movably attachable to the base member 30 by means of a screw 84 fixed in the guide block 85. On the side of the base 30 and beneath the disc there are line marks 86 and 87 respectively for centering the disc 83 with the bushing of the gimbal. The upper face of the disc 83 is marked with central axial lines and angular lines 90, 90' from the center thereof for the purpose of composing the symmetry and geometric outline of a dental cast as will be explained later. Within the disc there are three threaded holes, 91, for a long screw 92 serving as a levelling device.

Mounted upon the lower end portion of the shaft 74 is a combination plate 93, comprising three flat plates 94, 95, 96. The lower plate 94 carries a flat spring 97 attached to its center and which is curved at the ends with slots to permit the screws 98, 98 to pass into the plate 94. The terminal portions of the spring fall within a transverse channel of the plate 95. There is a slot 97' on each side of the plate 95 through which a screw 98 with a washer passes engaging the plate 94, thus permitting the plate 94 to be shifted sidewise and clamped into any position. A flat spring 99 is attached at its center portion to the top face of the plate 95 and rests in a channel of the upper plate 96. Plate 96 has a short slot 100 on each end, through which a screw 101 passes engaging the plate 95 and permitting movement of the plates 94 and 95 in forward and rearward movements and locking same in any position.

Upon the upper face of plate 94 are two arms 102, 102 having hooked ends 102', 102'. These are pivotally attached to the plate 94 at 200, 200, and the two hooked ends 102', 102' are attached to each other by a coil spring 103. Stop pins 201, 201, carried by the plate 94 limit the inward movement of arms 102, 102. It will thus be seen that the plate 94 can be moved sidewise and retained in that position by the screws 98, 98 and which when released will be brought back to the center position by the spring 103 and arms 102, 102.

The plate 96 is connected to the plate 94 by means of the two coil springs 104, 104. It will thus be seen that, if the screws 101, 101, are loosened, the plates 94 and 95 can be moved forwardly and backwardly with respect to a plate 96. If the screws 101, 101 are tightened and the screws 98, 98 are loosened, then plate 94 can be moved sideways with respect to plates 95 and 96. It will be further noticed that, if the screws 101, 101 and 98, 98 are loosened, the plates 94 and 95 can be given a spring controlled rocking movement with respect to plate 96.

It will thus be noted that the elements of the combination plate just described are similar to a universal gimbal with a rocking movement at their shifting cross axes.

An upper model-holding plate 108 is attached to the plate 94 by screws 109, 109 and a lower model-holding plate 108' is attached to the plate 83 by screws 109', 109'. See Figures 5 and 6.

The upper model-holding plate 108 has two opposed model-setting tapered screws 110', 110' and the lower model-holding plate 108' has two opposed model-setting tapered screws 110', 110', which are imbedded in the plaster for attaching the casts to the model-holding plates. By removing the screws we can detach the casts from the model-holding plates.

The first described upper gimbal construction serves many purposes. The central bushing with its chuck arrangement and the side screw will hold, besides the shaft 74, which carries the combination plate with the upper model holder, interchangeably, any shaft at the end of which different geometric instruments can be attached, like a horizontal or spherical three point divider in order to symmetrically place the lower cast 110' in the lower model holder 108' in proper relation to the center of the gimbal and attach the cast to the model holder with plaster 111'. Through the central bushing a shaft with a point at the end can be placed and when the springs of the gimbal are released, it will act like a compass to describe a spherical surface of any radius from the center of the gimbal.

The last described combination plate, which is attached to the shaft 74, and simulates a limited gimbal, and to which the upper cast 110 is attached in a definite relation to the lower cast 110' like the jaws in the mouth, as this relationship was obtained by a wax bite from the patient's mouth, will permit the gliding and sliding of the upper cast over the lower producing equivalent positions of the two casts to each other, as the positions produced in the mouth by the movements of the mandible against the maxilla.

I have described hereinabove the mechanisms provided in my instrument for the proper placing of the models, or casts, in the instrument according to a definite geometric plan, taking as the starting point the center of the dental mass in front of the skull and in the face, and constructing the three dimensional orientation planes for proper architecture of the dental apparatus; also the mechanisms necessary for the proper functioning of the dental machine in perfect balanced occlusion as it does in the mouth normally, the same way the teeth would function within the mouth of a person from whom the said casts were made.

Figs. 18 and 19, and 20, illustrate a finished upper and lower edentulous case constructed on my instrument according to my geometric plan. Fig. 18 represents the centric static occlusion with proper jaw relationship and proper cusp relationship. Fig. 19 represents a phase of a dynamic action of the mandible by bringing the upper and lower arches and their teeth on the right side in an active position. Fig. 20 represents the relationship of the upper and lower cusps on the left side in a balancing position at the time when the right lateral position is in action. It is to be noted that the mandible, in assuming this active position and relationship on the right side and the balancing position at the same time on the left side, has to go through a combination of movements in all the three dimensions, down and forward, turn on the central vertical axis to the right, and coming up against the upper teeth. All these individual movements that the mandible has to make in order to obtain the resultant position, can be observed on my instrument and any interference of occlusal and incisal surfaces of the teeth during these movements easily spotted and corrected, so bringing about a correctly working balanced occlusion, the aim in dental restorations.

It is also important to note here that all these varied movements of the mandible are made physiologically possible by the special anatomical construction of the tempero-mandibular joint in the human body and by the special construction of the combination hinge joint in my instrument.

In the foregoing I have described the detailed construction of my device, how a number of interchangeable geometric instruments can serve different purposes in surveying the human dental apparatus and guide one to the proper method of reconstruction of an abnormal case to a normal functioning mechanism. I have therefore shown a few of these attachments in my drawings, the explanation of their mechanical construction and their useful operations in the building up of a correct set of teeth will be evident from the following description of the utilization of my apparatus.

Figure 15:
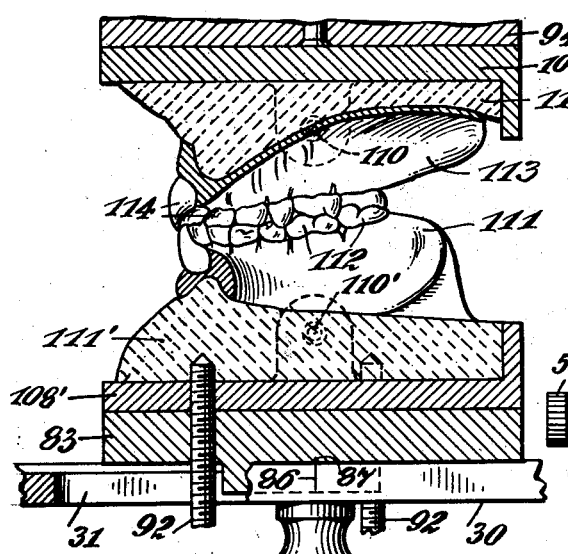
Fig. 15 is a central vertical section of the complete device with attached dentures or dental casts.

In Fig. 15, a plaster dental cast 111 of a lower jaw carrying the lower teeth 112, 112 and the plaster of Paris backing 111' is properly positioned upon the plate 108' and affixed thereto by the screws 110', 110', and a plaster dental cast 113 of an upper jaw carrying the upper teeth 114, 114 and the plaster of Paris backing 113' is properly positioned upon the plate 108 and affixed thereto by the screws 110, 110.

It is evident, therefore, from the mechanism previously described that the cast 113 can be raised, or lowered, with respect to the cast 111, vertically and that it can be moved in horizontal planes forward, backward, and sideways in straight lines or axial with the shaft 74 as a central axis or that it can be a rocking movement, all with respect to the cast 111. The cast 113 can also be made to assume different angular relations to the cast 111 by the use of the hinge mechanism in my apparatus.

It will thus be seen that by my apparatus the cast 113 with its teeth 114, 114, representing an upper jaw with its teeth 112, 112 can be given every movement with respect to cast 111 with its teeth 112, 112 representing a lower jaw with its teeth that would be possible in the human mouth, and that the relative teeth can be observed, in all possible human movement and that they can be temporarily fixed in any such position for purposes of detailed study.

By this method, the occlusion of the teeth can be determined, and any incorrections thereof during these movements can be corrected, until proper balanced occlusion in all positions can be obtained by removing interferences of cusps or incisal surfaces of the teeth.

It will thus be seen that by means of my apparatus a lower and upper set of natural teeth can be more accurately leveled out and more readily produced artificially than is possible through any attempt to produce them within the mouth of a person, or through the medium of any device which does not simulate their very natural movement.

Figure 16:
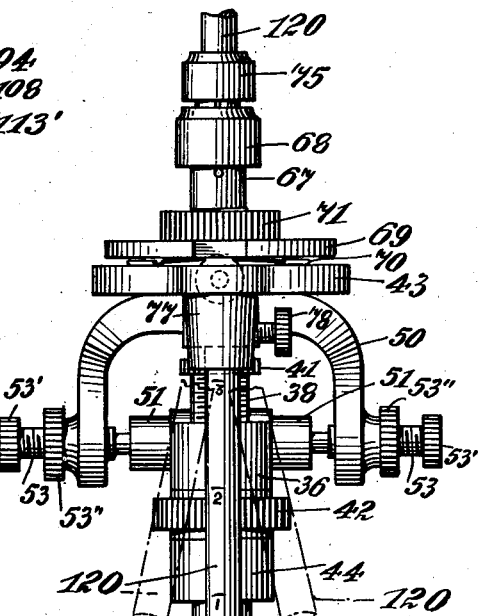
Fig. 16 is a front view of my apparatus with a pointer in the gimbal and lower dental cast checking the centricity of the dental arch and size of radius, for utilization of the instrument as a center finder for any mass, and particularly in this case, of the dental mass with a curved surface.

Fig. 16 illustrates one use for which my apparatus is adapted. A graduated pointed rod 120 is placed within the central recess of the bushing 77 and fixedly attached thereto by the screw 78, a chuck 68, and a lower dental cast 111 with its backing 111' and teeth 112, 112 is attached to the plate 108' by means of the screws 110', 110'. The various elements being so positioned, as previously described, that the vertical plane of the axis of the pointer 120 is in the exact geometric center of the natural and proper spherical movement of the lower set of teeth 112, 112. The average length of the radius of this spherical movement is four inches, although this radius varies in mouths of different formations. This will check the correctness of the set-up of the lower teeth on a wax base over the ridge on the cast of the lower jaw. It also can be used as a guide for the set-up of the teeth.

The pointer 120 is raised and lowered until its pointed end touches exactly the upper edge of the central tooth 112 and is then locked in this position by means of the screw 78.

The previously described gimbal movement will thus allow the movement of the pointer around the geometric center, the point of the pointer describing a spherical arc, the circumference of which is the proper level of the teeth for producing their natural function.

It will thus be seen that by this mechanism the teeth can be made of such outline as to have their natural and proper functioning effect.

Fig. 17 shows a modification of the instrument used for paralleling surfaces of the teeth either for outline of clasp or placing of removable precision attachments for removable appliances.

It is evident from the previously described construction of the gimbal of this device that the rod 121 can be so moved that the end of the rod 123 will abut upon the inner faces of the teeth 124, 124 and if moved upwardly and downwardly it will indicate perpendicular lines for the edges of the abutting teeth.

In Figs. 13 and 14, I show a modification of my device adapted for a simplified way of obtaining the different positions of one cast against the other through the use of the hinge mechanism, by the function of the steel points in the cups producing a universal joint action.

Figures 1, 2:
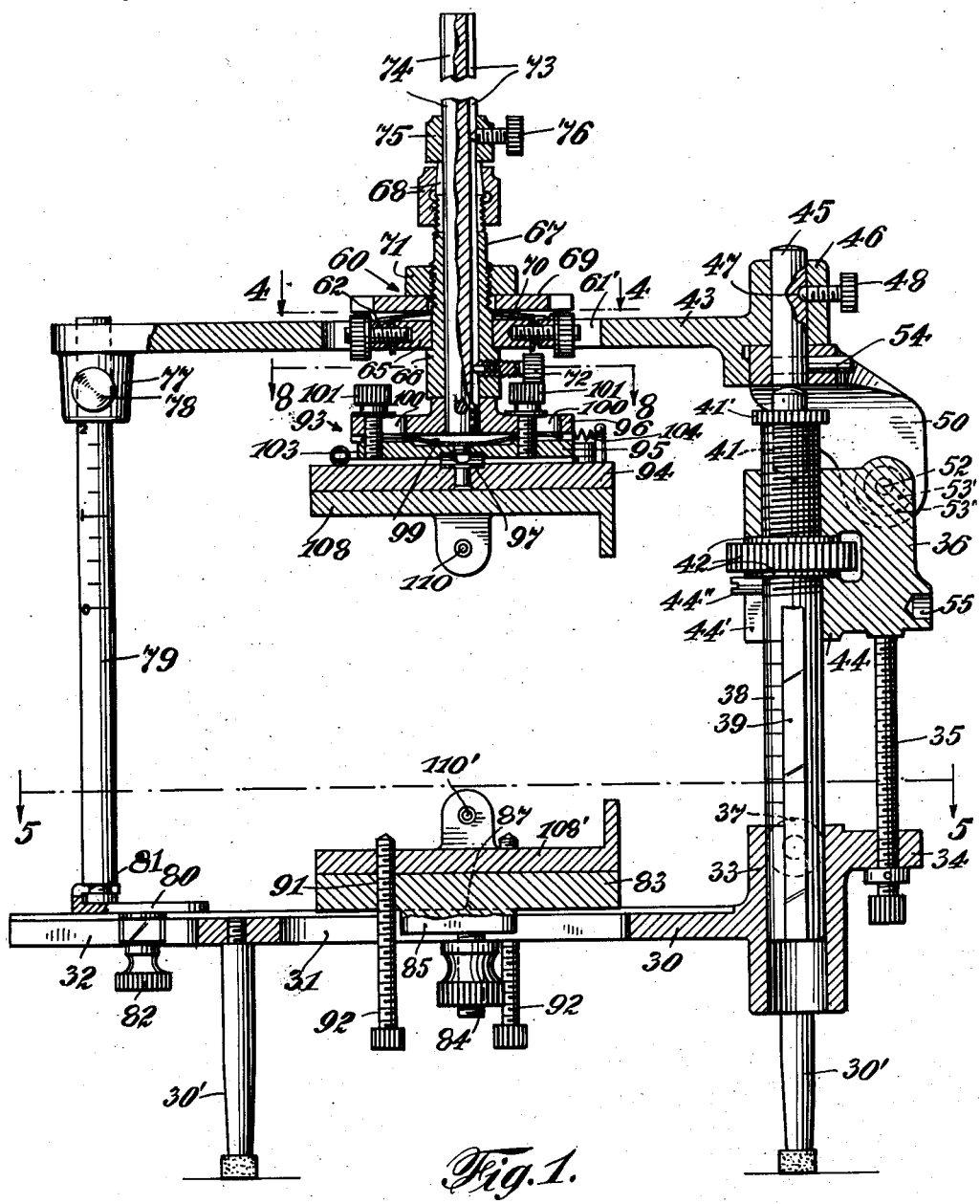
Fig. 1 is a vertical section of one form of my apparatus adapted for disposition thereon, for analysis and coordination pursuant to my invention, a set of upper and lower dentures, the figure being taken through the line 1—1 of Fig. 6.
Fig. 2 is a fragmentary side view of the lower dental cast support of my apparatus showing the centering lines.

In this form of my device, the platform 43 of the device of Fig. 1 with all of its attached parts is removed and replaced by platform 125, having the bushing 126 with the opening 127 for the reception of the rod 45, the bushing 128 having the opening 129 for the reception of the rod 79 and a longitudinal opening 130. Set screws 131, 131 are adapted to fixedly position the rods 79 and 45 in the respective openings 129 and 127.

A plate 132 adapted to have a dental cast holder attached thereto and positioned below the platform and has an attached screw 133 fixed in the guide block 135 of the cast plate 132, slidable within the opening 130 of the platform 125 and adapted to receive the lock nut 134.

The dental cast plate 132 can be moved longitudinally of the platform 125, and the platform 125 carrying the dental cast plate 132 can be moved vertically and can be moved hingedly by the mechanism upon the right side of Fig. 1 as previously described.

By moving these several elements of the device, a conception of the general outlines and formation of the teeth can be obtained for further consideration.

It is evident from the foregoing that my invention presents a new and novel device for the scientific examination, analysis and coordination of dental casts and the production of sets of teeth capable of effectively carrying out the functioning operations incident to proper mastication with correction of malformations of the dental mechanism incident to faulty teeth constructions.

While I have described specific embodiments of an apparatus constructed and operated in accordance with my invention, such embodiments are illustrated and described to demonstrate the principles of my invention and various changes may be obviously made therein without departing from my invention.

I claim:

1. In a device of the character described, in combination, a base platform, a vertically movable supporting member upon said base platform, a gimbal supporting platform hingedly mounted upon said supporting member, a gimbal upon said hinged platform, a vertically movable shaft upon said gimbal, an upper dental cast holder secured to the lower portion of said shaft and a lower dental cast holder secured to said base platform and capable of being positioned in vertical alignment with said upper dental cast holder.

2. In a device of the character described, in combination, a base platform, a vertically movable supporting member upon said base platform, a gimbal supporting platform hingedly mounted upon said supporting member, means to vertically move said gimbal supporting platform while said vertically movable supporting member is stationary, a gimbal carried by said gimbal supporting platform, a vertically movable shaft upon said gimbal, an upper dental cast holder secured to the lower portion of said shaft and a lower dental cast holder secured to said base platform and capable of being positioned in vertical alignment with said upper dental cast holder.

3. In a device of the character described, in combination, a base platform, a vertically movable supporting member carried by said base platform, a gimbal supporting platform hingedly carried by said supporting member, a gimbal carried by said gimbal supporting platform, a vertically movable shaft carried by said gimbal, an upper dental cast holder carried by the lower portion of said shaft, a lower dental cast holder carried by said base platform and capable of being positioned in vertical alignment with said upper dental cast holder and means adapted to allow said lower dental cast holder to be moved in a plane parallel to the plane of the base platform.

4. In a device of the character described, in combination, a base platform, a vertically movable supporting member, carried by said base platform, a gimbal supporting platform hingedly carried by said supporting member, a gimbal carried by said gimbal supporting platform, a vertically movable shaft carried by said gimbal, an upper dental cast holder carried by the lower portion of said shaft, means adapted to allow said upper dental cast holder to be rocked with respect to the plane of said gimbal supporting platform, and a lower dental cast holder carried by said base platform and capable of being positioned in vertical alignment with said upper dental cast holder.

5. In a device of the character described, in combination, a base platform, a vertically movable supporting member carried by said base platform, a gimbal supporting platform hingedly carried by said supporting member, adjustable means for supporting said gimbal supporting platform in parallel position with respect to said base platform, a gimbal carried by said gimbal supporting platform, a vertically movable shaft carried by said gimbal, an upper dental cast holder carried by the lower portion of said shaft and a lower dental cast holder carried by said base platform and capable of being positioned in vertical alignment with said upper dental cast holder.

6. In a device of the character described in combination, a base platform, a vertically movable supporting member carried by said base platform, a gimbal supporting platform hingedly carried by said supporting member, means adapted to vertically move said gimbal supporting platform while said vertically movable supporting member is stationary, a gimbal carried by said gimbal supporting platform, a vertically movable shaft carried by said gimbal, an upper dental cast holder carried by the lower portion of said shaft, means adapted to allow said upper dental cast holder to move in planes parallel to the plane of said gimbal supporting plane, and a lower dental cast holder carried by said base platform and capable of being positioned in vertical alignment with said upper dental cast holder.

7. In a device of the character described, in combination, a base platform, a vertically movable supporting member carried by said base platform, a gimbal supporting platform hingedly carried by said supporting member, a gimbal carried by said gimbal supporting platform, a vertically movable shaft carried by said gimbal, an upper dental cast carried by the lower portion of said shaft, means adapted to allow said upper dental cast holder to move in planes parallel to the plane of said gimbal supporting plane, a lower dental cast holder carried by said base platform and capable of being positioned in vertical alignment with said upper dental cast holder, and means adapted to allow said lower dental cast holder to be moved in a plane parallel to the plane of the base platform.

8. In a device of the character described, in combination, a base platform, a vertically movable supporting member carried by said base platform, a gimbal supporting platform hingedly carried by said supporting member, a gimbal carried by said gimbal supporting platform, a vertically movable shaft carried by said gimbal, an upper dental cast holder carried by the lower portion of said shaft, means adapted to allow said upper dental cast holder to move in planes parallel to the plane of said gimbal supporting plane, means adapted to allow said upper dental cast holder to be rocked with respect to the plane of said gimbal supporting platform, and a lower dental cast holder carried by said base platform and capable of being positioned in vertical alignment with said upper dental cast holder.

9. In a device of the character described, in combination, a base platform, a vertically movable supporting member carried by said base platform, a gimbal supporting platform hingedly carried by said supporting member, means adapted to vertically move said gimbal supporting platform while said vertically movable supporting member is stationary, a gimbal carried by said gimbal supporting platform, a vertically movable shaft carried by said gimbal, an upper dental cast holder carried by the lower portion of said shaft, means adapted to allow said upper dental cast holder to move in planes parallel to the plane of said gimbal supporting plane, means adapted to allow said upper dental cast holder to be rocked with respect to the plane of said gimbal supporting platform and a lower dental cast holder carried by said base platform and capable of being positioned in vertical alignment with said upper dental cast holder.

10. In a device of the character described, in combination, a base platform, a vertically movable supporting member carried by said base platform, a gimbal supporting platform hingedly carried by said supporting member, a gimbal carried by said gimbal supporting platform, a vertically movable shaft carried by said gimbal, an upper dental shaft holder carried by the lower portion of said shaft, means adapted to allow said upper dental cast holder to move in planes parallel to the plane of said gimbal supporting plane, adjustable means for supporting said gimbal supporting platform, in parallel position with respect to said base platform, a lower dental cast holder carried by said base platform, and capable of being positioned in vertical alignment with said upper dental cast holder.

11. In a device of the character described, in combination, a base platform, a vertically movable supporting member carried by said base platform, a gimbal supporting platform hingedly carried by said supporting member, a gimbal carried by said gimbal supporting platform, a vertically movable shaft carried by said gimbal, an upper dental case holder carried by the lower portion of said shaft, means adapted to allow said upper dental cast holder to move in planes parallel to the plane of said gimbal supporting plane, means adapted to allow said upper dental cast holder to be rocked with respect to the plane of said gimbal supporting platform, adjustable means for supporting said gimbal supporting platform in parallel position with respect to said base platform, a lower dental cast holder carried by said base platform and capable of being positioned in vertical alignment with said upper dental cast holder.

VICTOR STOLL.

REFERENCES CITED

The following references are of record in the file of this patent:

UNITED STATES PATENTS

| Number | Name | Date |
|---|---|---|
| 733,321 | Griswold | July 7, 1903 |
| 1,400,028 | Cohen | Dec. 13, 1921 |
| 1,468,063 | Weinstein | Sept. 18, 1923 |
| 1,526,619 | Williams | Feb. 17, 1925 |
| 1,546,423 | Williams | July 21, 1925 |
| 1,814,750 | Fritzenwallnon | July 14, 1931 |
| 1,831,390 | Lindelov | Nov. 10, 1931 |
| 2,003,727 | Tofflemire | June 4, 1935 |

FOREIGN PATENTS

| Number | Country | Date |
|---|---|---|
| 256,010 | Great Britain | Aug. 5, 1926 |